(12) United States Patent
Lukas et al.

(10) Patent No.: US 8,616,108 B2
(45) Date of Patent: Dec. 31, 2013

(54) GUIDE RAIL FOR A PORTABLE POWER TOOL

(75) Inventors: Heiner Lukas, Esllingen (DE); Juergen Gairing, Stuttgart (DE); Steffen Weber, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 13/063,423

(22) PCT Filed: Jul. 17, 2009

(86) PCT No.: PCT/EP2009/059198
§ 371 (c)(1),
(2), (4) Date: Mar. 10, 2011

(87) PCT Pub. No.: WO2010/028892
PCT Pub. Date: Mar. 18, 2010

(65) Prior Publication Data
US 2011/0162216 A1 Jul. 7, 2011

(30) Foreign Application Priority Data
Sep. 15, 2008 (DE) .......................... 10 2008 042 084

(51) Int. Cl.
*B23D 59/00* (2006.01)
*B23Q 9/00* (2006.01)
*B23B 11/00* (2006.01)

(52) U.S. Cl.
USPC ............................................. 83/821; 30/289

(58) Field of Classification Search
USPC ............... 83/821, 745, 829, 574, 743, 441.1; 30/289; 446/268; 52/589.1, 309.3; 24/615, 616, 618, 573
See application file for complete search history.

(56) References Cited

U.S. PATENT DOCUMENTS

| 1,404,976 | A | * | 1/1922 | Kozlosky et al. | 238/231 |
| 3,072,938 | A | * | 1/1963 | Phaneuf | 15/22.1 |
| 4,850,735 | A | * | 7/1989 | Hansen et al. | 403/330 |
| 4,908,917 | A | * | 3/1990 | Kazle | 24/615 |
| 2003/0014851 | A1 | * | 1/2003 | Murai et al. | 24/615 |
| 2008/0184656 | A1 | * | 8/2008 | Lee et al. | 52/688 |
| 2009/0308218 | A1 | * | 12/2009 | Raff et al. | 83/745 |

FOREIGN PATENT DOCUMENTS

DE 19923642 11/2000
DE 102007021334 11/2008

OTHER PUBLICATIONS

International Search Report corresponding to PCT Application No. PCT/EP2009/059198, mailed Nov. 2, 2009 (German and English language document) (4 pages).

* cited by examiner

*Primary Examiner* — Ghassem Alie
(74) *Attorney, Agent, or Firm* — Maginot, Moore & Beck

(57) ABSTRACT

A guide rail for a portable power tool includes a releasable connecting device and at least two individual rails which are to be joined together to form a common rail and which can be locked together via the releasable connecting device. The releasable connecting device includes at least one connecting latch on a first individual rail of the at least two individual rails. The connecting latch is adjustable between a locking position and a release position. The connecting latch, for shifting from the locking position into the release position, performs a movement relative to the first individual rail on which the connecting latch is held. The connecting latch is engaged in the locking position with a locking counterpart arranged on a second individual rail of the at least two individual rails.

9 Claims, 3 Drawing Sheets

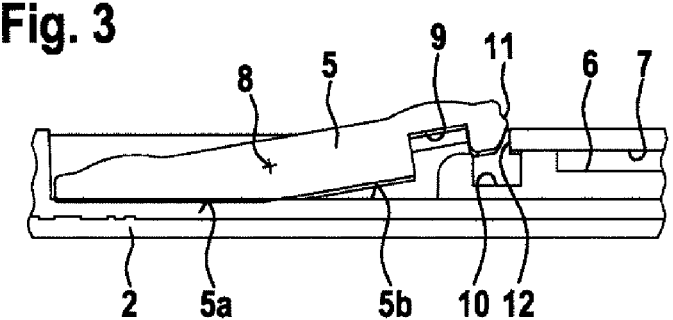
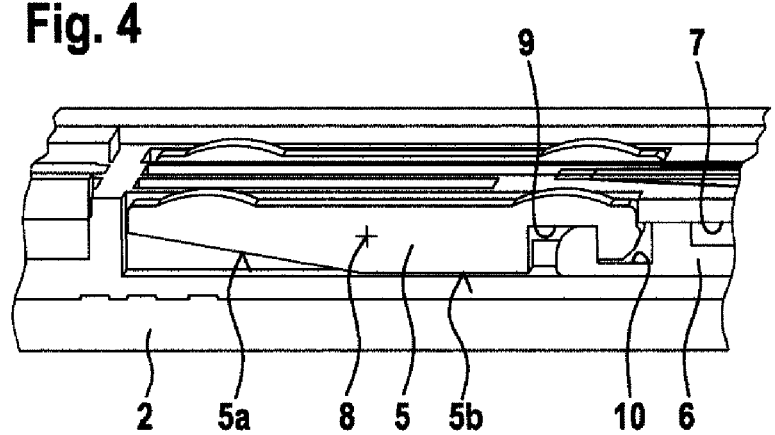
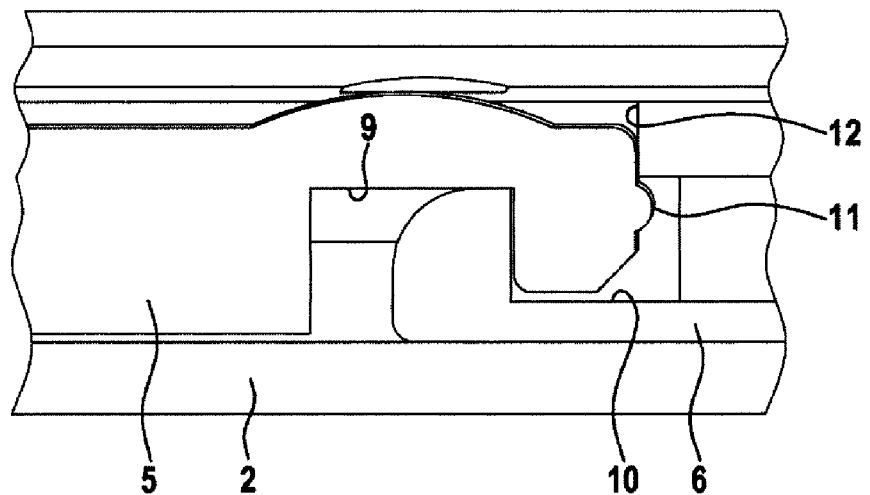

GUIDE RAIL FOR A PORTABLE POWER TOOL

This application is a 35 U.S.C. §371 National Stage Application of PCT/EP2009/059198, filed Jul. 17, 2009, which claims the benefit of priority to Serial No. 10 2008 042 084.0, filed Sep. 15, 2008 in Germany, the disclosures of which are incorporated herein by reference in their entirety.

BACKGROUND

The disclosure relates to a guide rail for a portable power tool.

The invention relates to a guide rail for a portable power tool according to the preamble of claim 1.

Described in DE 10 2004 017 420 A1 is a portable electric tool which, by way of example, is designed as a portable circular saw, router or jigsaw and to which a guide rail which can be put onto or clamped on the workpiece to be machined is assigned, said guide rail serving to displace the portable electric tool lengthwise along the longitudinal axis of the guide rail. A straight cut is to be made possible by means of the guide rail. Made in the guide rail is a slot for accommodating a sliding block which is connected to the portable electric tool and which can slide in the slot. To make longer cuts, the guide rail can be connected to an extension rail. To this end, the guide rail has a plurality of accommodating openings at one end face, and pegs which are arranged on the axial end face of the extension rail can be pushed into said accommodating openings.

In order to ensure a neat cutting pattern when crossing the separating point between guide rail and extension rail, it is necessary for the retaining forces between the rails in the rail longitudinal direction to be high enough that unintentional release of the rails is avoided despite the sliding of the portable electric tool along the rails in the slot thereof.

SUMMARY

The object of the disclosure is to design, using simple structural measures, a guide rail composed of individual rails in such a way that a neat cutting pattern is ensured.

This object is achieved according to the disclosure.

The guide rail according to the disclosure serves to guide a portable power tool, for example a portable circular saw, a router or a jigsaw, in order to ensure during the sawing a straight cut in the workpiece to be machined. In order to also be able to make longer cuts, the guide rail consists of at least two individual rails which are to be joined together and which can be locked together via a releasable connecting device. The connecting device comprises a connecting latch on an individual rail, which connecting latch can be adjusted between a locking position and a release position. The connecting latch is held on the individual rail in an adjustable manner and performs a movement relative to the individual rail when being shifted from the locking position into the release position. Assigned to the connecting latch is a locking counterpart which is arranged on the second individual rail, the connecting latch being engaged with the locking counterpart in the locking position.

In the locking position, the individual rails are fixedly held on one another at least in the rail longitudinal direction, which is at the same time the displacement direction of the portable power tool on the guide rail, such that forces occurring during the machining, in particular during the relative movement of the portable power tool on the guide rail, cannot lead to a release of the connection and to a gap developing between the individual rails. The connecting device can at the same time be realized structurally in a simple manner since only a connecting latch is required on one of the individual rails, said connecting latch interacting with an associated locking counterpart. Since the connecting latch is held on one of the individual rails and at the same time can perform a movement relative to this individual rail, simple manipulation is ensured, since the connecting latch can be adjusted between its locking position and its release position by manual actuation, wherein the mounting of the connecting latch on the individual rail assists simplified manipulation.

According to an expedient development, the connecting latch overcomes a pressure point when being shifted from the release position into the locking position. As a result, a haptic impression that the connecting latch has also actually reached its locking position and that the two individual rails are therefore properly held on one another is conveyed to the operator. When the pressure point is reached or overcome, this is felt during the manual actuation of the connecting latch. In addition to or as an alternative to the haptic impression, another means of providing a sensory indication that the pressure point has been overcome, for example by the generation of a noise, such as a clicking noise for example, may also be appropriate. In principle, instead of generating an appropriate noise by a pressure point being overcome, it is also possible to generate said noise in another way by a component which generates a clicking noise being actuated, for example in the path in which the connecting latch is shifted from the release position into the locking position, but without having to provide an increase and a decrease in the expenditure of force for the adjustment of the connecting latch, as when overcoming a pressure point.

The pressure point is realized, for example, by contact elements being arranged between the connecting latch and the locking counterpart, said contact elements coming into contact only for a short period during the shifting into the locking position, the contact being neutralized again when the locking position is reached. For example, the contact element is formed on one of the individual rails as a protruding bead or projection or the like on the connecting latch, said bead or projection briefly coming into contact with a component on the opposite individual rail during the shifting into the locking position, the pressure point also being overcome when the contact between the bead or projection and the associated component is overcome.

In addition to the connecting latch, the connecting device preferably also comprises a push-in element which can be pushed into an associated recess in the opposite individual rail and with which the connecting latch is to be locked. In this embodiment, the connecting latch is advantageously arranged on its individual rail in such a way that a section of the connecting latch does not project axially beyond the end face of the individual rail either in the release position or in the locking position. The connection to the second individual rail is produced by the connecting latch coming into a locking position with the push-in element on the other individual rail. By the insertion of the push-in element into an associated recess in the individual rail having the connecting latch, a form-fitting connection between the individual rails is at the same time ensured in the transverse direction, that is to say transversely to the guide rail longitudinal axis.

For effective locking that is reliable for a long operating period, the connecting latch and the push-in element are preferably provided with claws which correspond to one another and which interlock in the locking position, such that a form-fitting connection between connecting latch and push-in element is achieved in the rail longitudinal direction. This form-fitting connection is neutralized again when the connecting latch is shifted into the release position, such that the push-in element can be pulled axially out of the recess in the individual rail and the two individual rails can be released from one another.

According to a further expedient embodiment, the connecting latch, during the shifting movement from the release position into the locking position, pulls the opposite individual rail into a position in which said individual rails are brought close to one another. This is done, for example, in such a way that a component of the connecting latch already comes into contact with a component on the opposite individual rail before the locking position is reached and, during the further shifting movement until the locking position is reached, the opposite individual rail is pulled up axially until the position in which the individual rails are brought as close to one another as possible is also reached when the locking position is reached. Technically, this can be realized, for example, by virtue of the fact that, in the embodiment of the connecting latch and of the locking counterpart with corresponding claws, at least one claw has a slanted contact surface which is at an angle of greater than zero and less than 90° to the rail longitudinal axis. On account of the slanting position of the contact surface, the component of the connecting latch which is in contact slides along the contact surface and thus pulls the opposite individual rail into the locking position, in which said individual rails are brought close to one another.

BRIEF DESCRIPTION OF THE DRAWINGS

Further advantages and expedient embodiments can be gathered from the further claims, from the description of the figures and from the drawings, in which:

FIG. 3 shows the connecting device with connecting latch and push-in element just before the locking position is reached, FIG. 4 shows connecting latch and push-in element in the locked position, FIG. 5 shows an enlarged illustration of the locked connecting device.

DETAILED DESCRIPTION

Figure 1:
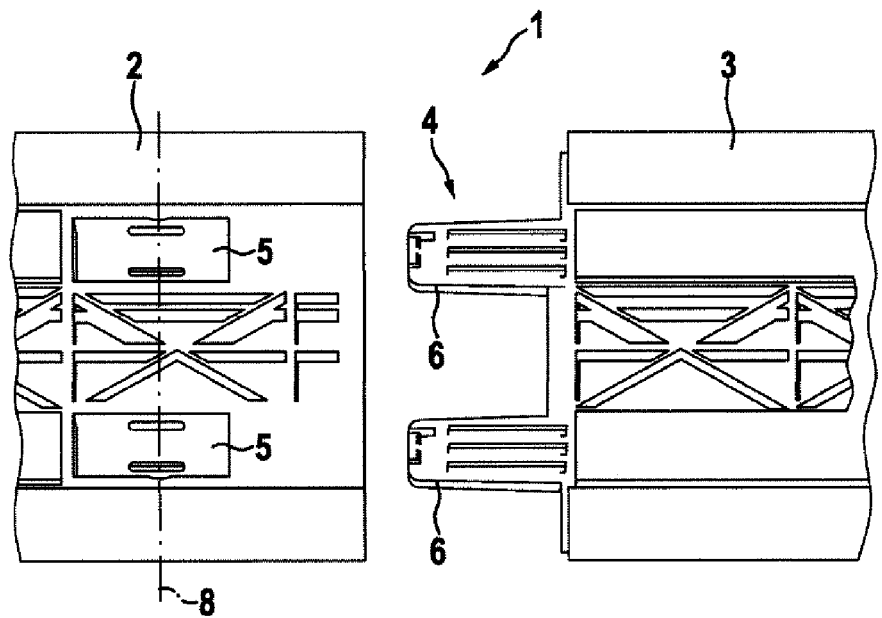
FIG. 1 shows two individual rails which are to be composed to form a common guide rail for a portable power tool and which are to be locked together by means of a connecting device which comprises two push-in elements on the end face of one individual rail and two connecting latches on the opposite individual rail.

In the figures, the same components are provided with the same reference numerals.

Shown in FIG. 1 is a guide rail 1 which is to be composed of two individual rails 2 and 3 and which serves to guide a portable power tool, for example a portable circular saw, a router or a jigsaw. The portable electric tool is guided along the longitudinal axis of the guide rail 1, which is put onto the workpiece to be machined and connected thereto. The guide rail permits a straight and neat cut through the tool to be machined.

In order to be able to realize various lengths of the guide rail 1, the guide rail is of multi-piece construction and comprises a plurality of individual rails 2 and 3 which are to be connected to one another by means of a connecting device 4. The individual rails 2 and 3 can have different lengths, or individual rails of different length can be combined with one another, in order to set the desired overall length in this way. The connecting device 4 consists of connecting latches 5, which are connected to the first individual rail 2, and of push-in elements 6, which are fixedly connected to the second individual rail 3. In the exemplary embodiment, in each case two connecting latches 5 are arranged in parallel and so as to lie next to one another in the same axial position; accordingly, two push-in elements 6 are located in positions parallel to one another on the end face of the second individual rail 3. The push-in elements 6 project beyond the end face of the individual rail 3 and are to be inserted into recesses 7 (FIG. 2) which are located in the end face of the opposite individual rail 2 and which extend right up to the connecting latch 5.

The connecting latches 5 are rotatably mounted in the first individual rail 2 and can be pivoted between a release position and a locking position about a rotation axis 8 running transversely to the rail longitudinal axis. In the release position, the push-in elements 6 inserted into the recess 7 can be pulled out axially; in the locking position, the push-in elements 6 are fixedly connected to the connecting latches 5, such that axial removal of the second individual rail from the first individual rail 2 is ruled out.

In the locking position, the connecting latch 5 and the associated push-in element 6 form a form-fitting connection in the rail longitudinal direction. To this end, the end faces of connecting latch 5 and push-in element 6 which face one another are each provided with a claw 9 and 10, respectively, wherein the claws 9 and 10, in the locking position (FIGS. 4, 5), are located in an interlocking position. The openings of the claws 9 and 10 are located on opposite sides, such that interlocking of the claws is made possible when the connecting latch is pivoted.

Figure 2:
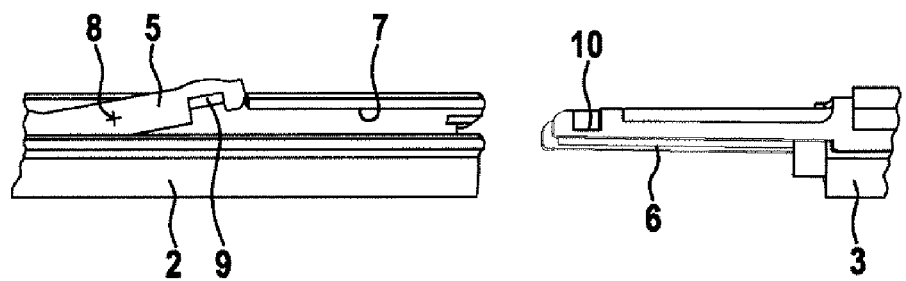
FIG. 2 shows the individual rails in side view, with one of the connecting latches in the open position, in which a push-in element on the end face of the other individual rail can be inserted completely into an associated recess of the individual rail having the connecting latch.

The shifting movement for achieving the locking position is shown in various stages in FIGS. 2 to 4. According to FIG. 2, the push-in element 6 on the end face of the individual rail 3 is not yet inserted into the associated recess 7 in the individual rail 2. The connecting latch 5 is located in its swung-open position, which is at the same time the release position and in which the end claw 9 is located in a raised position relative to the recess 7.

In FIG. 3, the push-in element 6 is inserted into the recess 7 in the individual rail 2, to be precise to such an extent that the two individual rails are located at least approximately in a position in which they are brought as close to one another as possible in the axial direction. The connecting latch 5 is still swung open about its rotation axis 8. When the connecting latch 5 is swung shut, the recesses of the claw 9 on the end face of the connecting latch 5, said recesses being U-shaped in cross section, and of the claw 10 on the end face of the push-in element 6 can be brought into form-fitting connection.

Shown in FIG. 4 is the locking position, in which the claws 9 and 10 on the connecting latch 5 and on the push-in element 6, respectively, interlock in a form-fitting manner, such that a form fit is formed in the longitudinal direction of the guide rail.

The walls on the claws 9 and 10 on the inner side of each U-shaped recess of the claw form respective contact surfaces which slide on one another in the radial direction during the sliding movement of the connecting latch 5 for reaching the locking position. It may be expedient for at least one of the walls or contact surfaces to be of slanted design, such that this wall is at an angle of greater than zero and less than 90° to the guide rail longitudinal axis. This has the advantage that, with the shifting of the connecting latch from the release position into the locking position, the second individual rail having the push-in element 6 is pulled axially even closer to the first individual rail 2 by the radial sliding of the contact surfaces of the claws 9 and 10 on one another, wherein if need be the individual rails can be restrained in a set manner for an optimum and fixed connection between said individual rails.

In order to permit or facilitate the rotary or pivoting movement of the connecting latch 5 about its rotation axis 8 in its position in the individual rail 2, the underside of the connecting latch 5 is provided with two bearing surfaces 5a and 5b arranged at an angle to one another, the axial position of the rotation axis 8 coinciding with the transition between the two bearing surfaces 5a and 5b arranged at an angle to one another. In the opened position of the connecting latch 5 (FIG. 3), the supporting surface 5a bears in a planar manner against the base of the accommodating space for accommodating the connecting latch 5 in the individual rail 2. In the closed or locking position (FIG. 4), on the other hand, the second supporting surface 5b adjacent to the end claw 9 bears in a planar manner against the base of the accommodating space for accommodating the connecting latch. Tipping of the connecting latch 5 about the rotation axis 8 with respective flat support of the supporting surface is therefore achieved. As a result, both the opened position and the closed position of the connecting latch 5 is designed to be relatively stable.

As can be seen from the enlarged illustration according to FIG. 5, a projection or bead 11 is arranged on the axial end face of the claw 9 on the connecting latch 5, and this projection or bead 11, when the connecting latch 5 is being shifted from the opened position into the closed position, is directed past, with contact, an end edge 12 of an element belonging to the individual rail 2. Both in the opened position of the connecting latch 5 and in the closed position, direct contact between the bead 11 and the end edge 12 is avoided. The contact is only achieved in an intermediate position during the shifting between opened position and closed position. During the contact between the bead 11 and the end edge 12, a pressure point is achieved on account of the increased friction, and the connecting latch 5 must be actuated with increased force or an increased moment in order to overcome said friction. This pressure point is sensed haptically by the operator; in addition, a clicking noise, which is perceived by the operator, is also generated at least when the pressure point is neutralized when the closed or locking position is reached. When the operator perceives haptically or acoustically that the pressure point is crossed, this indicates to the operator that the locking position between the individual rails has been successfully achieved.

Figure 6:
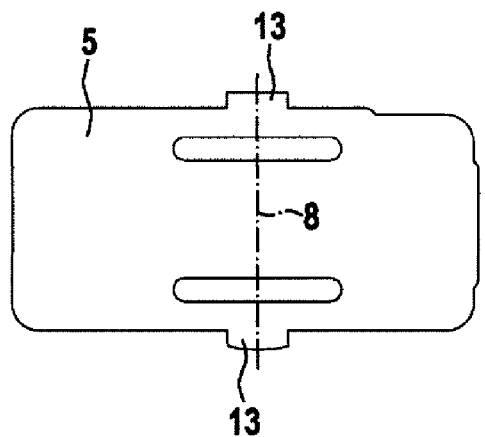
FIG. 6 shows a plan view of the connecting latch.
Figure 7:
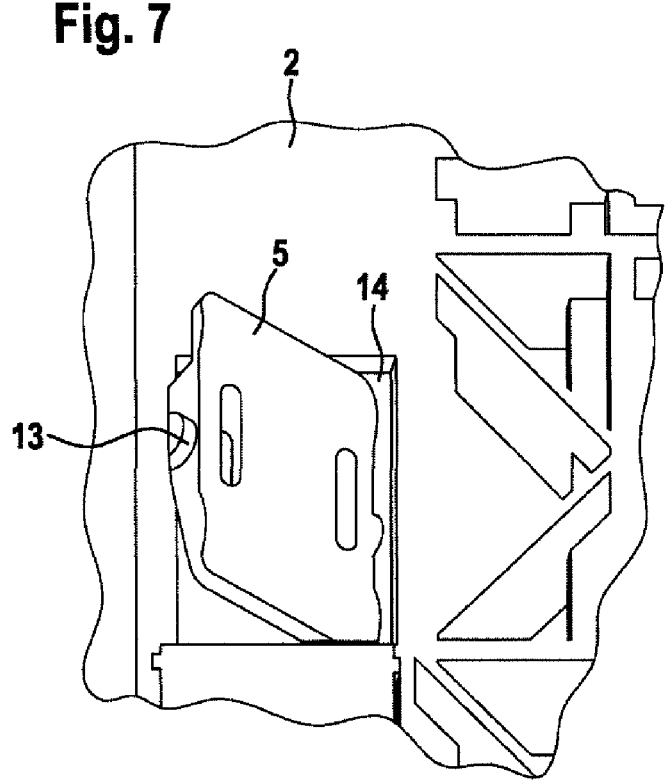
FIG. 7 shows a plan view of an individual rail with a connecting latch during the assembly process.

As can be seen from FIGS. 6 and 7, the rotatability of the connecting latch 5 with respect to the individual rail 2 is provided for by virtue of the fact that the opposite lateral sides of the connecting latch 5 are each provided with a projection 13 which projects in the fitted position into an associated recess in the individual rail 2, thereby making possible the tilting or rotary movement about the rotation axis 8 of the connecting latch 5. The connecting latch 5 is in this case inserted into an accommodating space 14 which is incorporated into the individual rail 2.

The invention claimed is:
1. A guide rail for a portable power tool, comprising:
a first individual rail;
a second individual rail configured to be joined to the first individual rail to form a common guide rail; and
a releasable connecting device configured to lock the first individual rail and the second individual rail together,
wherein the releasable connecting device comprises at least one connecting latch on the first individual rail and a locking counterpart on the second individual rail,
wherein the connecting latch is configured to move between a locking position and a release position,
wherein the connecting latch is configured to move relative to the first individual rail to shift between the locking position and the release position,
wherein the connecting latch is engaged in the locking position with the locking counterpart,
wherein the connecting latch overcomes a pressure point when being shifted from the release position into the locking position and the connecting latch overcomes the pressure point when being shifted from the locking position into the release position
wherein the releasable connecting device further comprises at least one push-in element on the second individual rail configured to be pushed into a recess in the first individual rail,
wherein the locking counterpart is defined on the at least one push-in element, and
wherein the connecting latch is configured in the locking position to lock with the locking counterpart on the push-in element.

2. The guide rail as claimed in claim 1, wherein the pressure point is realized by a contact element arranged on the connecting latch, said contact element, during the shifting into the locking position, briefly coming into contact with another contact element located on the first individual rail, the contact being neutralized again when the locking position is reached.

3. The guide rail as claimed in claim 2, wherein the contact element arranged on the connecting latch includes a protruding round bead on the connecting latch.

4. The guide rail as claimed in claim 1, wherein:
the connecting latch includes a first claw having a first projection and a first recess, and
the locking counterpart includes a second claw having a second projection and a second recess, and
the first projection is positioned in the second recess and the second projection is positioned in the first recess to interlock the connecting latch and the locking counterpart in the locking position.

5. The guide rail as claimed in claim 1, wherein the connecting latch, during the shifting movement from the release position into the locking position, pulls the second individual rail into a position in which it is brought close to the first individual rail.

6. The guide rail as claimed in claim 4, wherein at least one of the first claw and the second claw has a slanted contact surface which is at an angle of greater than zero and less than 90° to the rail longitudinal axis.

7. The guide rail as claimed in claim 1, wherein the connecting latch generates a clicking noise when being shifted from the release position into the locking position.

8. The guide rail as claimed in claim 1, wherein the releasable connecting device further comprises:
two connecting latches arranged parallel to one another; and
two locking counterparts which are arranged parallel to one another being assigned to the two connecting latches which are arranged parallel to one another.

9. A portable power tool, comprising:
a guide rail including (i) a first individual rail, (ii) a second individual rail configured to be joined to the first individual rail, (iii) and a releasable connecting device configured to lock the first individual rail and the second individual rail together,
wherein the releasable connecting device comprises at least one connecting latch on the first individual rail and a locking counterpart on the second individual rail,
wherein the connecting latch is configured to move between a locking position and a release position,
wherein the connecting latch is configured to move relative to the first individual rail to shift between the locking position and the release position, and
wherein the connecting latch is engaged in the locking position with the locking counterpart,
wherein the connecting latch overcomes a pressure point when being shifted from the release position into the locking position and the connecting latch overcomes the pressure point when being shifted from the locking position into the release position,
wherein the releasable connecting device further comprises at least one push-in element on the second individual rail configured to be pushed into a recess in the first individual rail,
wherein the locking counterpart is defined on the at least one push-in element, and
wherein the connecting latch is configured in the locking position to lock with the locking counterpart on the push-in element.

* * * * *